United States Patent [19]
Lane, Jr.

[11] Patent Number: 5,700,034
[45] Date of Patent: Dec. 23, 1997

[54] VEHICLE SAFETY APPARATUS WITH SELECTIVE ENERGY MANAGEMENT

[75] Inventor: Wendell C. Lane, Jr., Romeo, Mich.

[73] Assignee: TRW Vehicle Safety Systems Inc., Lyndhurst, Ohio

[21] Appl. No.: 522,730

[22] Filed: Sep. 1, 1995

[51] Int. Cl.$^6$ ............................................. B60R 22/28
[52] U.S. Cl. ................................. 280/805; 297/472
[58] Field of Search ........................... 280/801.1, 805, 280/806, 807; 297/470, 471, 472; 188/371, 377

[56] References Cited

U.S. PATENT DOCUMENTS

| | | | |
|---|---|---|---|
| 3,857,528 | 12/1974 | Fiala | 242/107.4 |
| 3,997,190 | 12/1976 | Seiffert et al. | 280/747 |
| 4,655,312 | 4/1987 | Frantom et al. | 280/807 |
| 5,211,694 | 5/1993 | Sakakida et al. | 280/806 |
| 5,224,736 | 7/1993 | Sedlmayr et al. | 280/807 |
| 5,544,918 | 8/1996 | Fleming et al. | 280/805 |

OTHER PUBLICATIONS

Hexcel, "Design Data for the Preliminary Selection of Honeycomb Energy Absorption Systems", 1993 or earlier.

Article entitle "Advanced Restraint System Concepts", 1979 or earlier.

Primary Examiner—Paul N. Dickson
Attorney, Agent, or Firm—Tarolli, Sundheim, Covel, Tummino & Szato

[57] ABSTRACT

A vehicle safety apparatus (10) has a seat belt system (16) with webbing (24) for restraining a vehicle occupant (88). A sensor (116) detects the occurrence of a condition indicative of a vehicle collision. A payout device (36) enables pay out of the webbing (24) in response to force applied to the webbing by the vehicle occupant (88). The payout device (36) is enabled to function in response to the signal. During payout of the webbing (24), energy is absorbed. In one embodiment, energy is absorbed by deforming a deformable material (104).

13 Claims, 5 Drawing Sheets

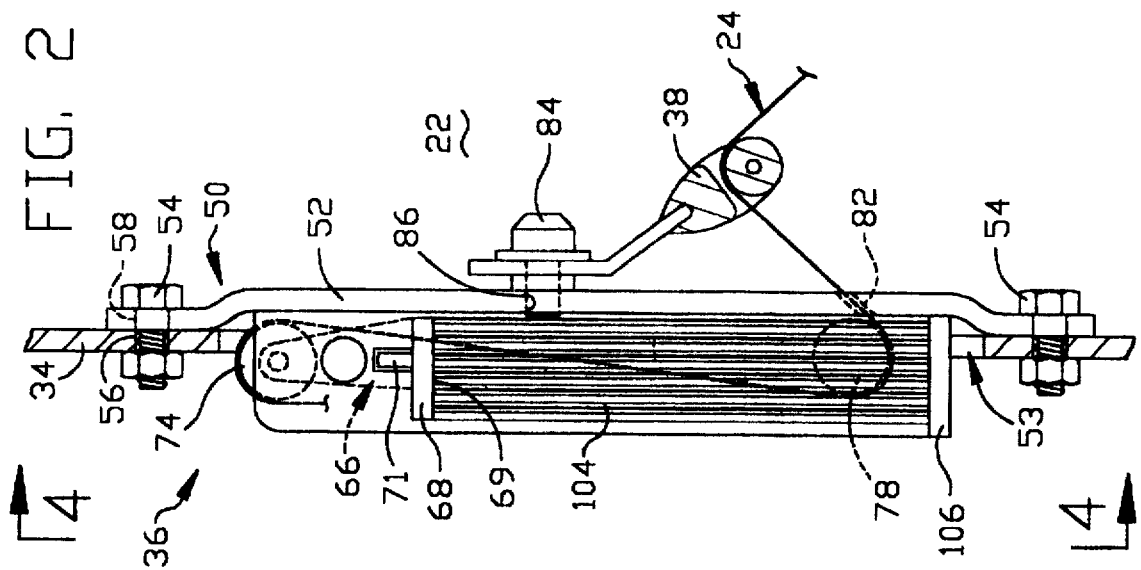
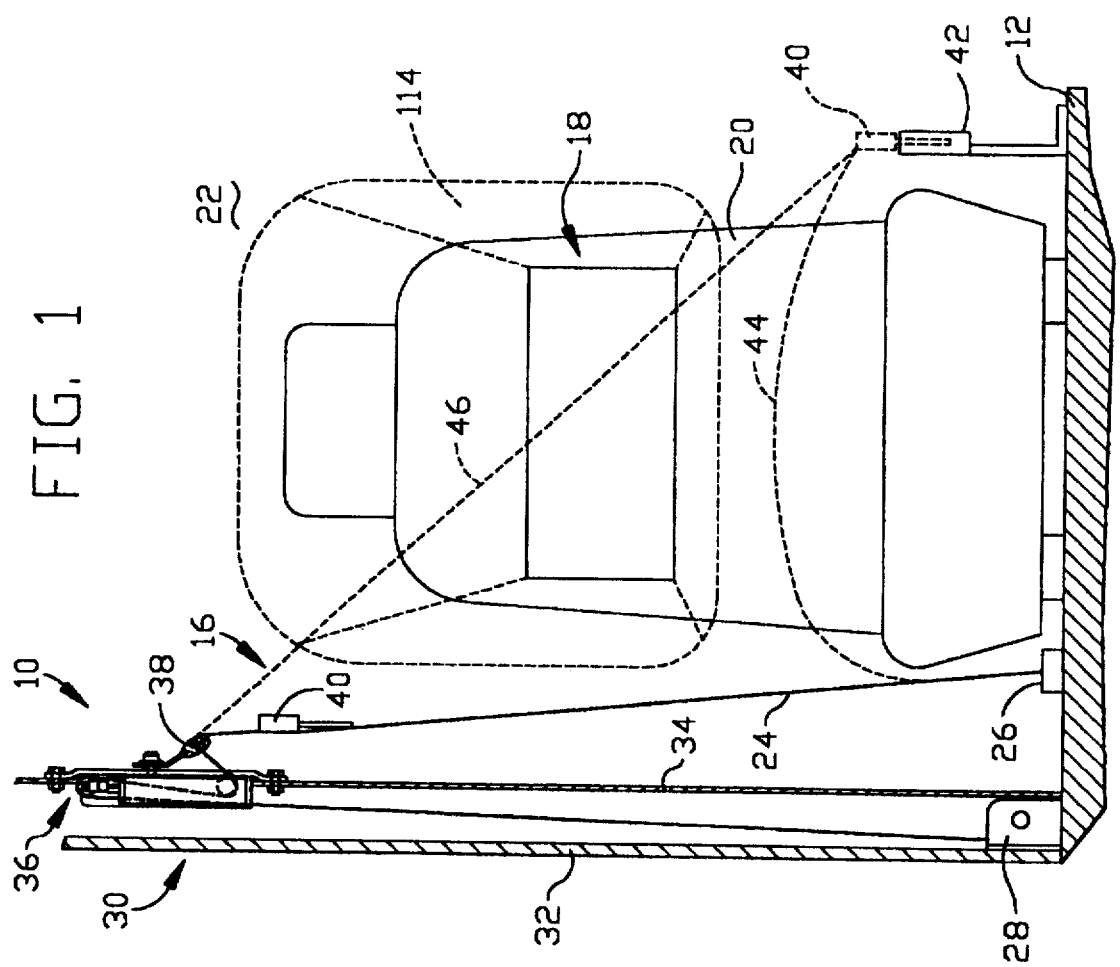

VEHICLE SAFETY APPARATUS WITH SELECTIVE ENERGY MANAGEMENT

BACKGROUND OF THE INVENTION

1. Technical Field

The present invention relates to a vehicle occupant restraint system. In particular, the present invention relates to an energy management device for seat belt webbing used in a seat belt system.

2. Description of the Prior Art

Seat belt systems are commonly used to restrain vehicle occupants. A typical seat belt system includes a length of seat belt webbing fastenable about a vehicle occupant. In the event of sudden deceleration, such as occurs in a vehicle collision, the vehicle occupant is restrained from movement relative to the vehicle by the webbing.

The vehicle occupant can experience a sudden load if the occupant's movement is restrained by an inextensible length of a webbing. To alleviate this sudden load, it is known to stitch together portions of the webbing. When the vehicle occupant applies a sufficient force to the webbing, the load on the webbing tears the stitching. The webbing portions separate to increase the webbing length. This can reduce the abruptness of the load experienced by the vehicle occupant.

SUMMARY OF THE INVENTION

The present invention is a vehicle safety apparatus which includes seat belt webbing for restraining a vehicle occupant. A sensor detects the occurrence of a condition indicative of a vehicle collision. The sensor provides a signal in response to detecting the condition indicative of a vehicle collision. A webbing payout device is enabled in response to the signal to permit pay out of the webbing.

In a preferred embodiment, an air bag is also deployed to restrain the vehicle occupant upon the occurrence of a condition indicative of a vehicle collision. The air bag is inflated in response to the signal from the sensor. Also in the preferred embodiment, the webbing pays out due to force applied to the webbing by the vehicle occupant. Energy is absorbed as the webbing is payed out. Preferably, the energy is absorbed by a deformable material.

BRIEF DESCRIPTION OF THE DRAWINGS

Further features of the present invention will become apparent to those skilled in the art to which the present invention relates from reading the following specification with reference to the accompanying drawings, in which:

FIG. 1 is a schematic illustration of a portion of a vehicle which has a safety apparatus in accordance with the present invention;

FIG. 2 is an enlarged view, partially in section, of a portion of the safety apparatus illustrated in FIG. 1, with certain parts removed;

DESCRIPTION OF THE PREFERRED EMBODIMENT

Figure 3:
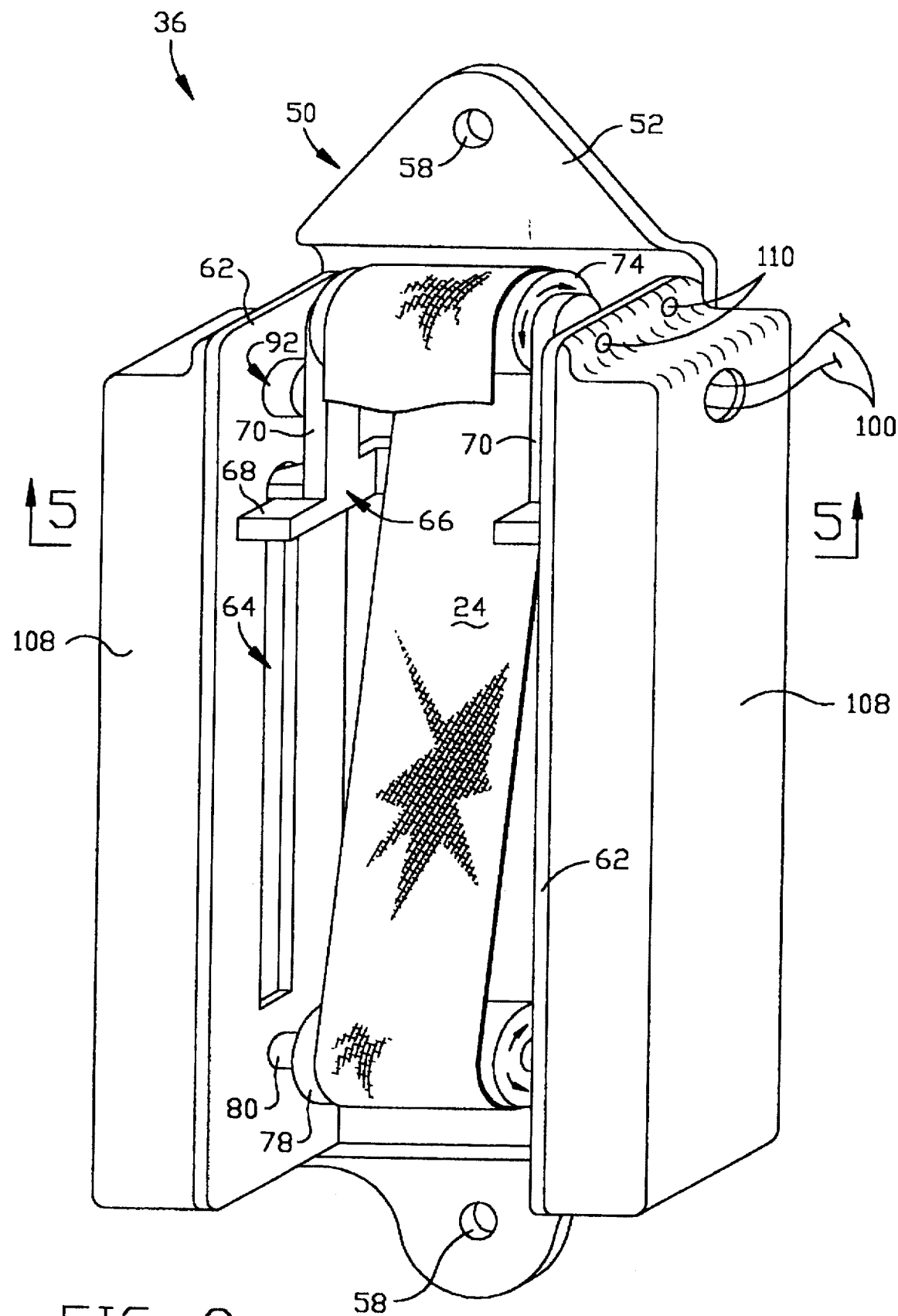
FIG. 3 is a perspective view of the portion of the safety apparatus illustrated in FIG. 2.

As representative of the present invention, a vehicle safety apparatus 10 for use in a vehicle 12 is shown in FIG. 1. The safety apparatus 10 includes a seat belt system 16 and an air bag module 18 which are associated with a seat 20 in the vehicle's passenger compartment 22. The air bag module 18 is schematically illustrated as being in front of the vehicle seat 20, and would be mounted in the vehicle instrument panel or steering wheel, neither of which are illustrated in FIG. 1.

The seat belt system 16 includes seat belt webbing 24 which is fixed at one end to an anchor 26 in the passenger compartment 22. The anchor 26 secures the end of the webbing 24 to the vehicle 12. The webbing 24 extends to a webbing retractor 28. The retractor 28 has a bias mechanism (e.g., a spring, not shown) for retracting the webbing 24 into the retractor 28.

The retractor 28 also has a lock mechanism 29 (FIG. 7), e.g., ratchet wheels, a blocking pawl, and an activation device (schematically illustrated), for preventing withdrawal of the webbing 24 from the retractor 28 upon the occurrence of a condition indicative of a vehicle collision. Such a condition may be, for example, acceleration of the seat belt webbing above a predetermined level or sudden vehicle deceleration above a predetermined magnitude. The prevention of webbing withdrawal is commonly referred to as locking of the retractor and is referred to herein as such.

The retractor 28 (FIG. 1) is fixed between outer and inner walls 32 and 34 of a B-pillar 30 of the vehicle 12, so that the webbing 24 extends upward from the retractor 28 within the B-pillar. The webbing 24 extends through a payout device 36 and out from the B-pillar 30 to a D-ring 38. A tongue assembly 40 is located on the webbing 24 between the D-ring 38 and the anchor 26. When the webbing 24 is withdrawn from the retractor 28, the tongue assembly 40 is engageable with a buckle 42 secured to the vehicle 12 at a side of the seat 20 opposite the anchor 26 and the retractor 28. In the withdrawn position, the segment of the webbing 24 located within the passenger compartment 22 has a lap portion 44, which extends across the lap of a vehicle occupant between the anchor 26 and the tongue assembly 40, and a torso portion 46, which extends across the torso of the vehicle occupant between the tongue assembly 40 and the D-ring 38.

The payout device 36 (FIG. 2) includes a metal frame 50. The frame 50 has a vertically elongate back plate 52 which extends over an opening 53 in the inner wall 34 of the B-pillar 30 and which is fixed to the inner wall 34. Two mounting connectors 54 extend through mounting holes 56 in the inner wall 34 and mounting holes 58 on the back plate 52 above and below the opening 53. Each mounting connector 54 may be any suitable connector, such as a bolt and nut combination.

The frame 50 has two guide walls 62 (FIG. 3) which extend perpendicularly from and vertically along the back plate 52. Each guide wall 62 has a guide slot 64 (only the guide slot 64 on one of the guide walls 62 is visible in FIG. 3). Each guide slot 64 extends vertically along the respective guide wall 62 for a substantial length of the guide wall 62. In a preferred embodiment, the vertical length of each of the guide slots 64 is approximately 8 inches (20 cm).

A metal carriage 66 is located on the frame 50 between and adjacent to the guide walls 62 and is vertically movable relative to the frame 50. The carriage 66 is initially located (see FIGS. 2–4) adjacent to an upper end of the frame 50. The carriage 66 has two arms 68 (FIG. 4) which extend generally horizontally. Each arm 68 extends through a respective guide slot 64 in a guide wall 62 and is narrowed at the guide slot 64 to define a neck 72 (FIG. 5). Each arm 68 has a flat bottom surface 69 and a reinforcing rib 71 (FIG.4) extending along the top of the arm 68.

The carriage 66 also includes two support arms 70 which extend vertically from the arms 68. Each support arm 70 is located adjacent to an inner side of a respective guide wall 62. The support arms 70 support a spindle 76 which extends between the two arms 70. The spindle 76 includes suitable rotary bearing members (e.g., a ball bearing array, not shown) which support an upper roller 74 for rotation about a horizontal axis relative to the spindle 76 and the carriage 66.

A lower roller 78 is located adjacent to a lower end of the frame 50, vertically below the upper roller 74. The lower roller 78 is supported on the guide walls 62 of the frame 50 by a spindle 80. The lower roller 78 is rotatable about a horizontal axis relative to the spindle 80 and the frame 50.

The webbing 24 extends upward from the retractor 28 (FIG. 1) along the B-pillar 30 to the upper roller 74 (FIG. 2). As the webbing 24 extends over the top of the upper roller 74, it is redirected downward from the upper roller 74 to the lower roller 78. The webbing 24 extends around the bottom of the lower roller 78 and is redirected in a generally upward direction through an aperture 82 in the back plate 52 toward the D-ring 38. The D-ring 38 is attached to a support stud 84 which extends from an internally threaded portion 86 of the back plate 52 of the frame 50. Thus, within the payout device 36, the webbing 24 has an "S" or sinusoidal shape.

Figure 4:
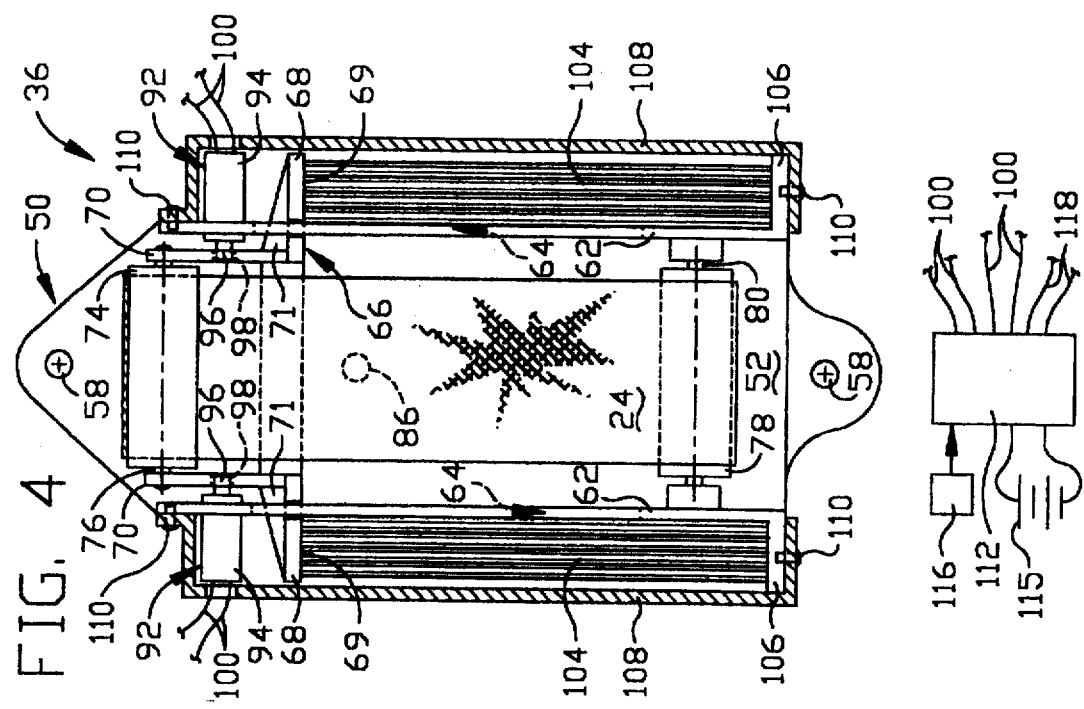
FIG. 4 is a view taken along line 4—4 of FIG. 2, with certain parts partially removed, and illustrating certain other parts in a first condition.
Figure 5:
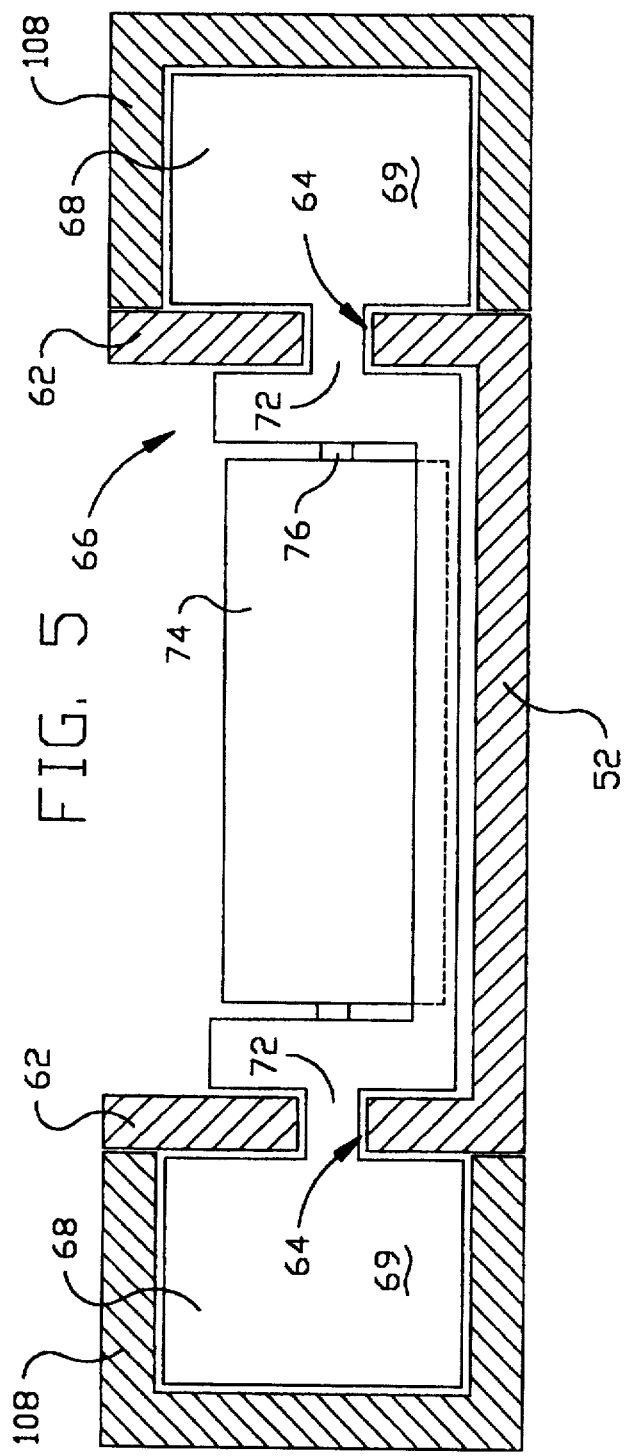
FIG. 5 is a sectional view taken along line 5—5 of FIG. 3.

The payout device 36 includes two solenoids 92 (FIG. 4). Each solenoid 92 is mounted on a respective one of the guide walls 62 adjacent to the upper end of the respective guide wall 62. Each solenoid 92 is of identical construction and identical reference numerals identify identical structure of the two solenoids.

Each solenoid 92 includes a body 94 having a plurality of wire windings (not shown) which are electrically excitable to create a magnetic field within the body 94. An electrical signal to excite the wire windings is supplied via electrical leads 100. A core pin 96 is movably disposed in an opening extending into the body 94 and is made of a ferrous material.

A compression spring (not shown) is engaged with the pin 96 in the body 94 and biases the pin 96 to protrude out from the body 94. The pin 96 extends from the body 94 into an aperture 98 in a respective support arm 70 under the bias of the spring until the wire windings are activated. The magnetic field acts upon the pin 96 and moves the pin out of the aperture 98 into the body 94 against the bias of the spring. The solenoids 92 thus selectively engage or release the carriage 66.

The payout device 36 includes two pieces of deformable material 104. Each piece of deformable material 104 is located adjacent to an outer side of a respective guide wall 62. Each piece of the deformable material 104 is supported on a support wall 106 of the frame 50 which extends horizontally and which perpendicularly intersects and is fixed to both the back plate 52 and the respective guide wall 62.

Each piece of the deformable material 104 is located such that the bottom surface 69 of the respective arm 68 of the carriage 66 is disposed above the piece of deformable material 104. A cover 108 is located on each side of the frame 50. The covers 108 are fixed to the frame 50 with fasteners 110.

In the preferred embodiment, the deformable material 104 is a material which is crushed, but which is structured to provide a constant resistance to being crushed. The internal structure of the deformable material 104 is honeycombed with a plurality of cells or layers which are elongate to extend parallel to the direction of movement of the carriage 66, i.e. vertical. The honeycomb structure of the deformable material 104 has a predefined linear crush resistance. This honeycombed structure buckles locally, wrinkling in an accordion fashion, along the vertical axis. Thus, the deformable material 104 remains essentially aligned between the respective arm 68 and the respective support wall 106 as the length of the deformable material 104 is reduced during crushing. The deformable material 104 is preferably a commercially available honeycomb material identified as Standard Core and marketed by Hexcel Corp. of Dublin, Calif.

A controller 112 (schematically illustrated, FIG. 4) provides an electrical signal from a power source 115, e.g., the vehicle battery, to the leads 100 of each of the solenoids 92. The controller 112 also provides an electrical signal via leads 118 to an inflator 122 (FIG. 6) of the air bag module 18. The inflator 122 provides inflation fluid to inflate an air bag 114 which is folded and stored behind deployment doors 124 in a portion 126, e.g., an instrument panel, of the vehicle 12. The inflator 122 may be any suitable known type, including a type of inflator which includes a stored pressurized gas, a material which is ignited to generate gas, or a combination of a stored pressurized gas and an ignitable material.

The controller 112 has a mechanism which provides the electrical signal to the solenoids 92 of the payout device 36 only if the air bag 114 of the air bag module 18 is to be deployed. In the preferred embodiment, the controller 112 is responsive to one or more conditions which is/are indicative of a vehicle collision in which inflation of the air bag 114 is desired. As representative, the safety apparatus 10 includes a sensor 116 (schematically illustrated) which detects sudden vehicle deceleration above a predetermined magnitude, such as occurs in a vehicle collision. Typically, this vehicle deceleration is greater in magnitude than the amount of deceleration which causes the retractor 28 to lock. In response to this vehicle deceleration, the sensor 116 provides a signal to the controller 112 indicative of the deceleration. The sensor 116 may alternatively just measure vehicle deceleration, and the controller may apply one or more algorithms known in the art to decide whether to deploy the air bag 114.

Figure 6:
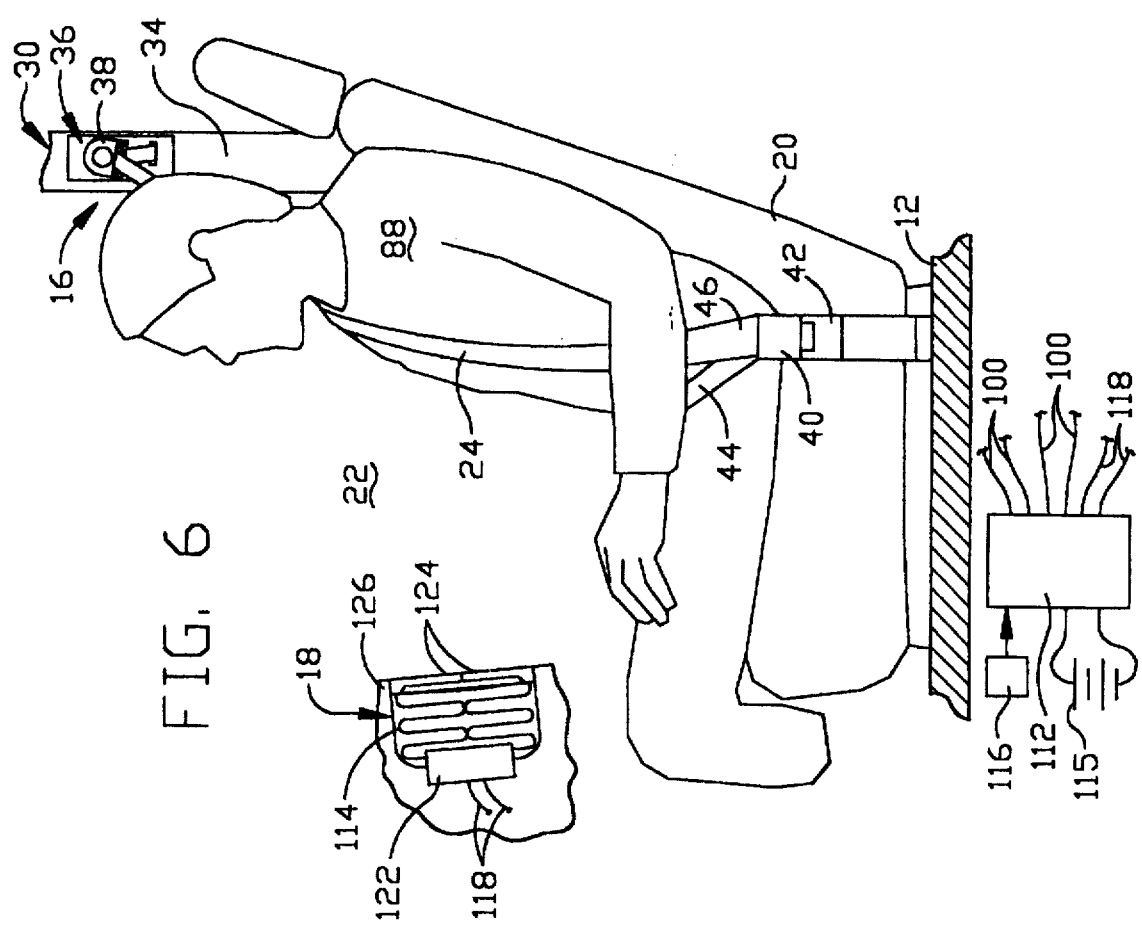
FIG. 6 is a schematic view of a seated vehicle occupant with the safety apparatus in a first operational condition.
Figure 7:
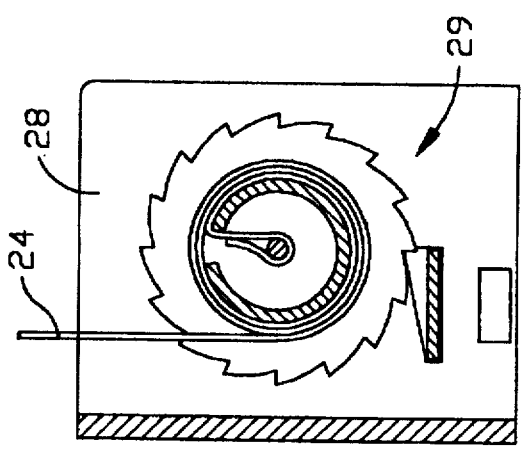
FIG. 7 is a sectional view of a portion of the safety apparatus in a first condition.

When a vehicle occupant 88 enters the vehicle 12 and is seated on the seat 20, the retractor 28 is in an unlocked condition (FIG. 7). The webbing 24 is withdrawn from the retractor 28 to extend across the vehicle occupant 88 (FIG. 6). Specifically, the vehicle occupant 88 grasps the tongue assembly 40 adjacent to the D-ring 38 and moves the tongue assembly 40 across his or her torso toward the buckle 42. The tongue assembly 40 is engaged with the buckle 42 (as shown in FIG. 6), and the webbing 24 extends across the vehicle occupant 88.

Within the payout device 36 (FIG. 4), the carriage 66 is adjacent to the upper end of the frame 50 and the pins 96 of the solenoids 92 extend into the respective apertures 98 in the respective adjacent support arms 70. The withdrawal motion pulls the webbing 24 from the retractor 28, over the top of the upper roller 74 (FIG. 2), under the bottom of the lower roller 78, and through the aperture 82 and the D-ring 38. A reverse path of motion of the webbing 24 occurs during retraction of the webbing to the retractor 28, under the influence of the bias mechanism in the retractor, after the vehicle occupant 88 disengages the tongue assembly 40 from the buckle 42.

During these withdrawal and retraction motions of the webbing 24, rotation of the upper and lower rollers 74 and 78 (shown by arrows in FIG. 3) permits movement of the webbing 24 without resistance. The rotation of the upper and lower rollers 74 and 78 is the only movement which occurs in the structure of the payout device 36 at this time. Specifically, the carriage 66 which supports the upper roller 74 does not move downward relative to frame 50. The solenoids 92 retain the carriage 66 and prevent downward movement of the carriage 66 along the guide slots 64 of the respective guide walls 62.

Normally, the retractor 28 remains unlocked, and the vehicle occupant 88 has a certain range of movement, e.g., such as to reach vehicle accessories, which is permitted by withdrawal of the webbing 24 from the retractor 28. During a sudden vehicle deceleration of a relatively low magnitude, the retractor 28 locks (FIG. 10, the activation device moves the blocking pawl into engagement with the ratchet wheels), and withdrawal of the webbing 24 from the retractor 28 is prevented. This relatively low magnitude of vehicle deceleration, if insufficient to require deployment of the air bag 114 and enablement of the payout device 36, results in the vehicle occupant 88 being restrained only by the webbing 24.

Figure 10:
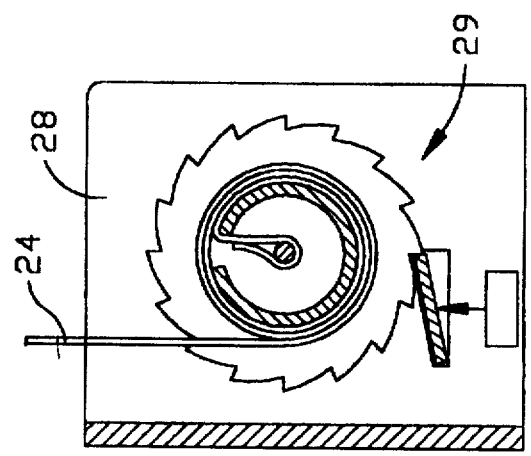
FIG. 10 is a view similar to FIG. 7 but illustrating a second condition.
Figure 9:
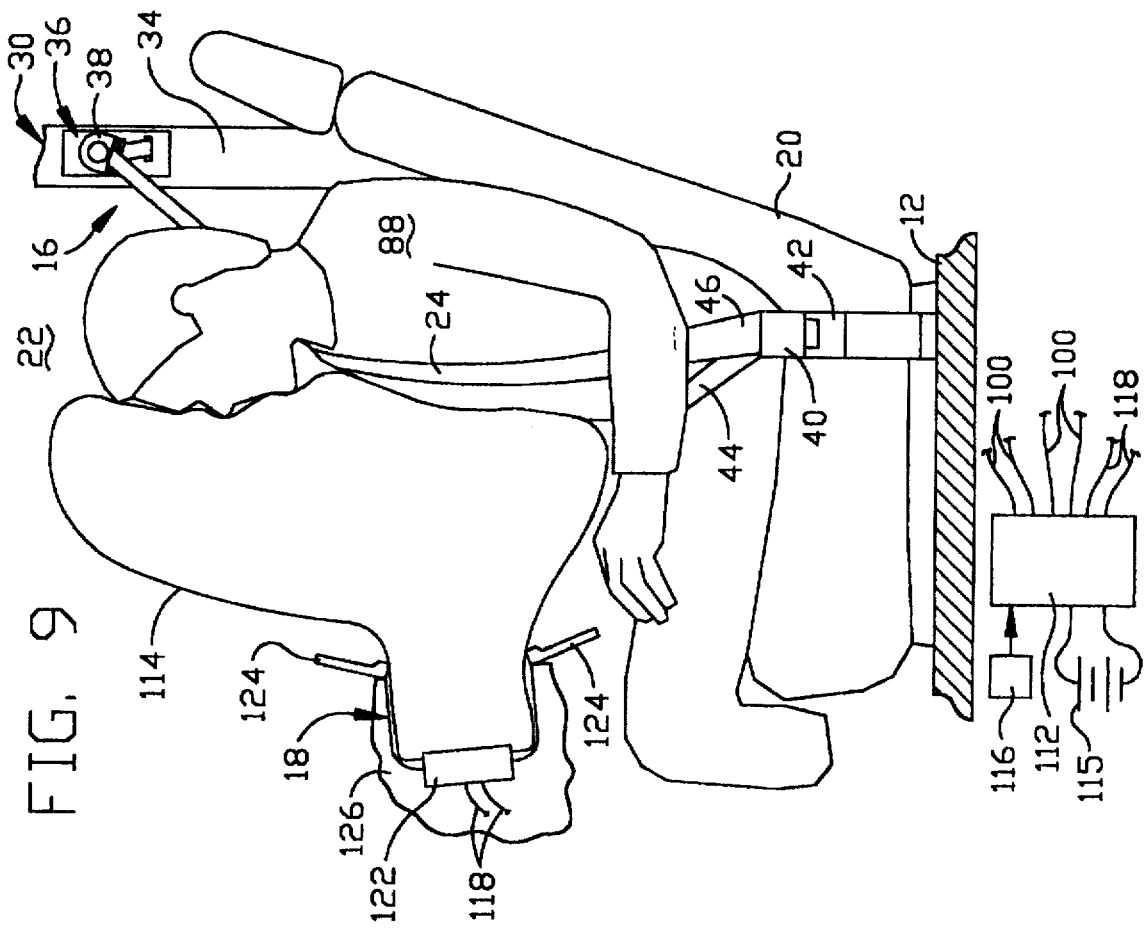
FIG. 9 is a view similar to FIG. 6, but with the safety apparatus in a second operational condition.

During a sudden vehicle deceleration of a relatively high magnitude, the retractor 28 is again locked (FIG. 10). In addition, the sensor 116 (FIG. 9) provides the signal to the controller 112. When the controller 112 receives the signal from the sensor 116, the controller 112 transmits an electrical signal, via leads 118, to the inflator 122 to cause the inflator 122 to inflate the air bag 114. The inflator 122 inflates the air bag 114 relatively quickly, on the order of several milliseconds. Thus, the air bag 114 is completely, or near completely, inflated before a vehicle occupant 88 moves forward due to the vehicle deceleration.

Figure 8:
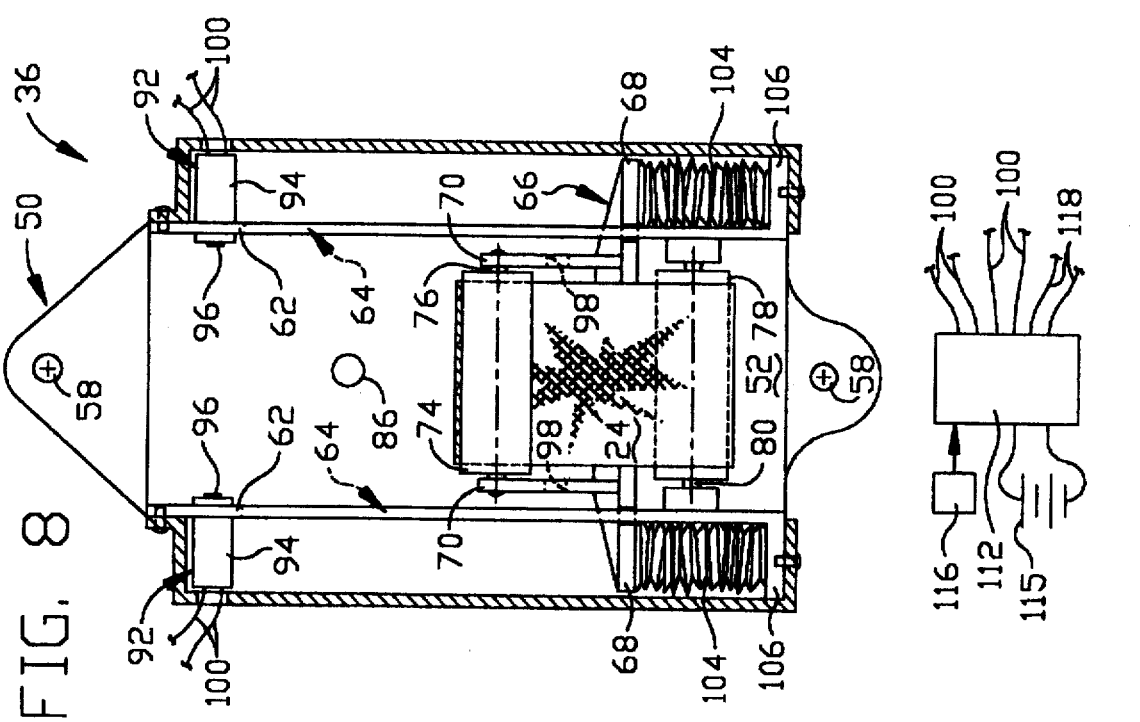
FIG. 8 is a view similar to FIG. 4, but illustrating certain parts in a second condition.

The controller 112 preferably simultaneously provides an electrical signal, via the leads 100, to activate the solenoids 92 (FIG. 8). However, if desired, there could be a time delay in activating the solenoids 92. Upon electrical activation of each solenoid 92, a magnetic field is created in the body 94, and the pin 96 is drawn into the body 94 against the bias of the spring. Thus, each pin 96 is withdrawn from its associated aperture 98 in the support arm 70 so that the carriage 66 is enabled to move downward along the frame 50.

When the carriage 66 is released, the amount of the webbing 24 located within the passenger compartment 22 (FIG. 9) of the vehicle 12 can be increased. Specifically, the carriage 66 (FIG. 8) and the supported upper roller 74 can move downward to decrease the distance between the upper roller 74 and the lower roller 78 and thereby decrease the overall length of the S-shaped loop of the webbing 24 within the payout device 36. In the preferred embodiment, the carriage 66 can move along the entire length, approximately 8 inches (20 cm), of the guide slots 64. Thus, because the webbing 24 is doubled over in its S-shaped loop, the maximum amount of webbing 24 which can be payed out of the payout device 36 to increase the length of the portion of the webbing 24 located within the vehicle compartment 22 is approximately 16 inches (40 cm).

The movement of the carriage 66 is caused by a tension force in the webbing 24 which is created when the vehicle occupant 88 is restrained by the webbing 24 and presses against the webbing 24 due the sudden vehicle deceleration. A force between the two looped ends of the webbing 24 at the upper and lower rollers 74 and 78, respectively, is created. The force urges the upper roller 74, and thus the carriage 66, to move downward toward the lower roller 78.

When the carriage 66 is moved downward relative to the frame 50 along its path of movement, the bottom surfaces 69 of the arms 68 bear upon the upper ends of the pieces of deformable material 104 to deform the deformable material. The deformable material 104 is deformed beyond its elastic limit and is thus permanently deformed or crushed between the respective arm 68 and the respective support wall 106. The deformable material 104 resists the downward movement of the carriage 66 so that the movement of the carriage 66 is smooth and also so that energy is dissipated/absorbed. Thus, the vehicle occupant 88 can move forward into the restraining air bag 114 while the tension force in the torso portion 46 of the webbing 24 achieves only a reduced peak value.

The deformation of the deformable material 104 is not instantaneous but instead occurs over a period of time. During this time period, the webbing 24 does not fully block forward movement of the vehicle occupant 88. Occupant deceleration resulting from engagement with the webbing 24 occurs over a longer period of time than it would occur if the webbing length was not permitted to increase.

The principle of conservation of energy states that the total occupant kinetic crash energy is $\frac{1}{2}m\,(v_i{}^2 - v_f{}^2)$, where m is the occupant's mass, $v_i$ is the velocity of the vehicle occupant 88 at the beginning of the crash and $v_f$ is the velocity of the vehicle occupant 88 at the end of the crash. The total occupant crash energy is dissipated by performing work on the vehicle occupant 88. Work, which is a force applied over a distance, must be performed on the vehicle occupant 88 to stop the occupant's motion. In a crash, work is performed on a vehicle occupant in a variety of means, including physical absorption by the vehicle occupant 88, interaction between the vehicle occupant 88 and the vehicle seat 20, and interaction between the vehicle occupant 88 and the webbing 24. Deformation of the deformable material 104 results in reapportionment of the work so that more work is performed by the interaction between the vehicle occupant 88 and the webbing 24 and less is physically absorbed by the vehicle occupant 88. Thus, kinetic energy of the moving vehicle occupant 88 is absorbed or dissipated by the deformation of the deformable material 104.

From the above description of the invention, those skilled in the art will perceive improvements, changes and modifications. Such improvements, changes and modifications within the skill of the art are intended to be covered by the appended claims.

Having described the invention, the following is claimed:

1. A vehicle occupant safety apparatus comprising:

a length of seat belt webbing extensible about a vehicle occupant to help protect the vehicle occupant;

a retractor on which said belt webbing is wound;

a base fixed in position relative to said retractor;;

a first roller supported on said base for rotation relative to said base about a first axis, said first axis being fixed relative to said base;

a second roller supported on said base for rotation relative to said base about a second axis spaced apart from said first axis, said second roller and said second axis being movable along said base in a direction toward said first roller;

said belt webbing extending around said first and second rollers in an S-shaped pattern;

electrically controlled blocking means engageable with said second roller, said blocking means having a first condition blocking movement of said second roller toward said first roller; and sensor means for detecting a condition indicative of a vehicle collision and for providing an electric release signal to said blocking means in response to sensing the condition;

said blocking means being releasable in response to said electric release signal to enable movement of said second roller along said base toward said first roller to pay out webbing from said first and second rollers.

2. A vehicle occupant safety apparatus as set forth in claim 1 wherein a first one of said base and said second roller includes surfaces defining a guide slot and a second one of said base and said second roller includes surfaces defining a member slidably received in said guide slot, said guide slot having a width sufficiently larger than the width of said member as to enable movement of said member along said guide slot without deforming said surfaces defining said guide slot during movement of said second roller toward said first roller.

3. A vehicle occupant safety apparatus as set forth in claim 2 further comprising an energy absorber associated with said second roller for resisting movement of said second roller toward said first roller and for absorbing energy during movement of said second roller toward said first roller.

4. A vehicle occupant safety apparatus as set forth in claim 1 wherein said blocking means comprises a solenoid having a portion which has a first position normally blocking movement of said second roller toward said first roller, said portion of said solenoid being movable in response to said electric release signal from the first position to a second position releasing said second roller for movement toward said first roller.

5. A vehicle occupant safety apparatus as set forth in claim 1 further comprising:

an energy absorber for resisting movement of said second roller toward said first roller and for absorbing energy during movement of said second roller toward said first roller; and an inflatable vehicle occupant protection device for, when inflated, helping to protect the vehicle occupant;

said sensor means including means for providing an actuation signal for inflating said inflatable device in response to detecting the condition indicative of a vehicle collision.

6. A vehicle occupant safety apparatus as set forth in claim 1 wherein said retractor is lockable to prevent withdrawal of belt webbing from said retractor upon detecting a condition indicative of a vehicle collision, said blocking means being releasable in response to said electric release signal to enable pay out of belt webbing when said retractor is locked.

7. A vehicle occupant safety apparatus as set forth in claim 1 further comprising an energy absorber for resisting movement of said second roller toward said first roller and for absorbing energy during movement of said second roller toward said first roller, said energy absorber comprising a deformable material which has a honeycomb structure which is crushed upon movement of said second roller toward said first roller.

8. A vehicle occupant safety apparatus comprising:

a length of seat belt webbing having first and second end portions and being extensible about a vehicle occupant to help protect the vehicle occupant;

a seat belt webbing retractor to which one end portion of said length of belt webbing is connected, said retractor being lockable to prevent withdrawal of belt webbing from said retractor;

payout means disposed at a position intermediate said end portions of said length of belt webbing for controlling the amount of belt webbing extensible about the vehicle occupant, said belt webbing being continuously movable through said payout means when said retractor is not locked;

said payout means including blocking means for controlling payout of belt webbing from said payout means, said blocking means having a first condition blocking payout of belt webbing from said payout means and being actuatable from the first condition to a second condition enabling payout of belt webbing from said payout means; and means for providing an actuating signal to said blocking means in response to detecting a condition indicative of a vehicle collision;

said blocking means being actuatable in response to said actuating signal to enable payout of belt webbing from said payout means when said retractor is locked.

9. A vehicle occupant safety apparatus as set forth in claim 8 wherein said actuating signal is an electric signal and said blocking means is electrically actuatable in response to said electric actuating signal to enable payout of belt webbing from said payout means.

10. A vehicle occupant safety apparatus as set forth in claim 8 further comprising an energy absorber for absorbing energy during payout of belt webbing from said payout means.

11. A vehicle occupant safety apparatus as set forth in claim 10 wherein said energy absorber comprises a honeycomb material which is crushed during payout of belt webbing from said payout means.

12. A vehicle occupant safety apparatus as set forth in claim 8 further comprising:

an energy absorber for absorbing energy during payout of belt webbing from said payout means; and an inflatable vehicle occupant protection device for, when inflated, helping to protect the vehicle occupant;

said means for providing an actuating signal including means for providing an actuation signal for inflating said inflatable device in response to detecting the condition indicative of a vehicle collision.

13. A vehicle occupant safety apparatus as set forth in claim 8 wherein said payout means comprises:

a base;

a first roller supported on said base for rotation relative to said base about a first axis, said first axis being fixed relative to said base;

a second roller supported on said base for rotation relative to said base about a second axis spaced apart from said first axis, said second roller and said second axis being movable along said base in a direction toward said first roller;

said belt webbing extending around said first and second rollers in an S-shaped pattern;

said blocking means being engageable with said second roller and having a first condition blocking movement of said second roller toward said first roller; and said blocking means being actuatable from said first condition in response to said actuating signal to enable movement of said second roller along said base toward said first roller to enable payout of belt webbing from said first and second rollers.

* * * * *